June 12, 1973 W. R. SCHOLLE 3,738,871
STORAGE BATTERY PLATES OF PLASTIC AND LEAD
Filed May 6, 1971 2 Sheets-Sheet 1
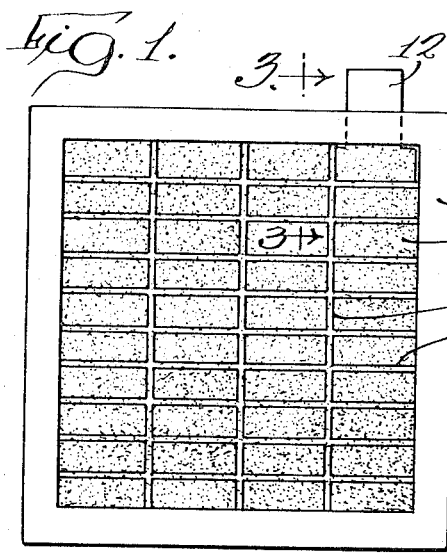
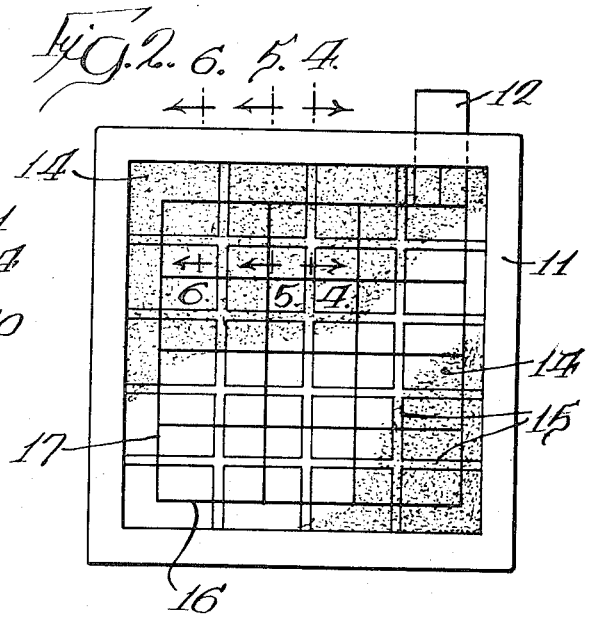
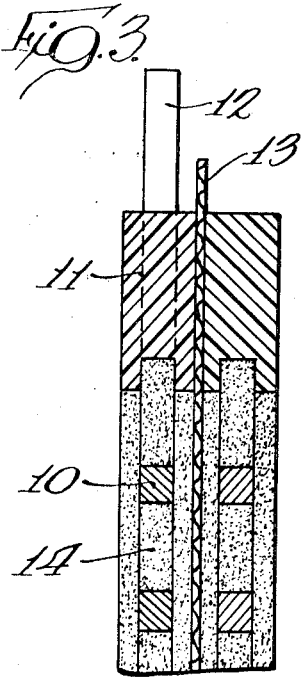
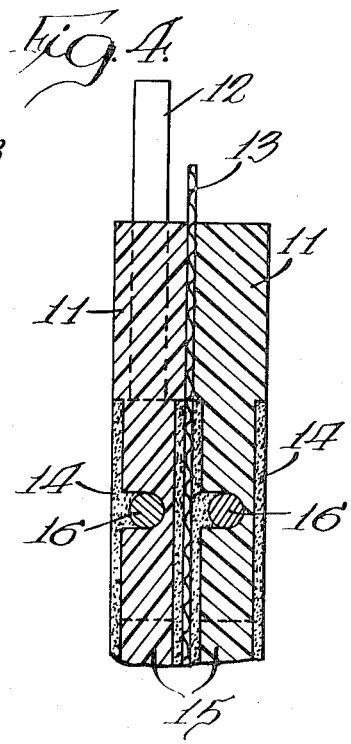
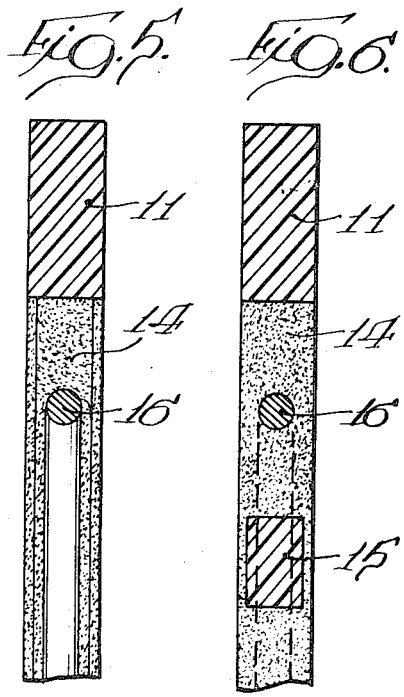

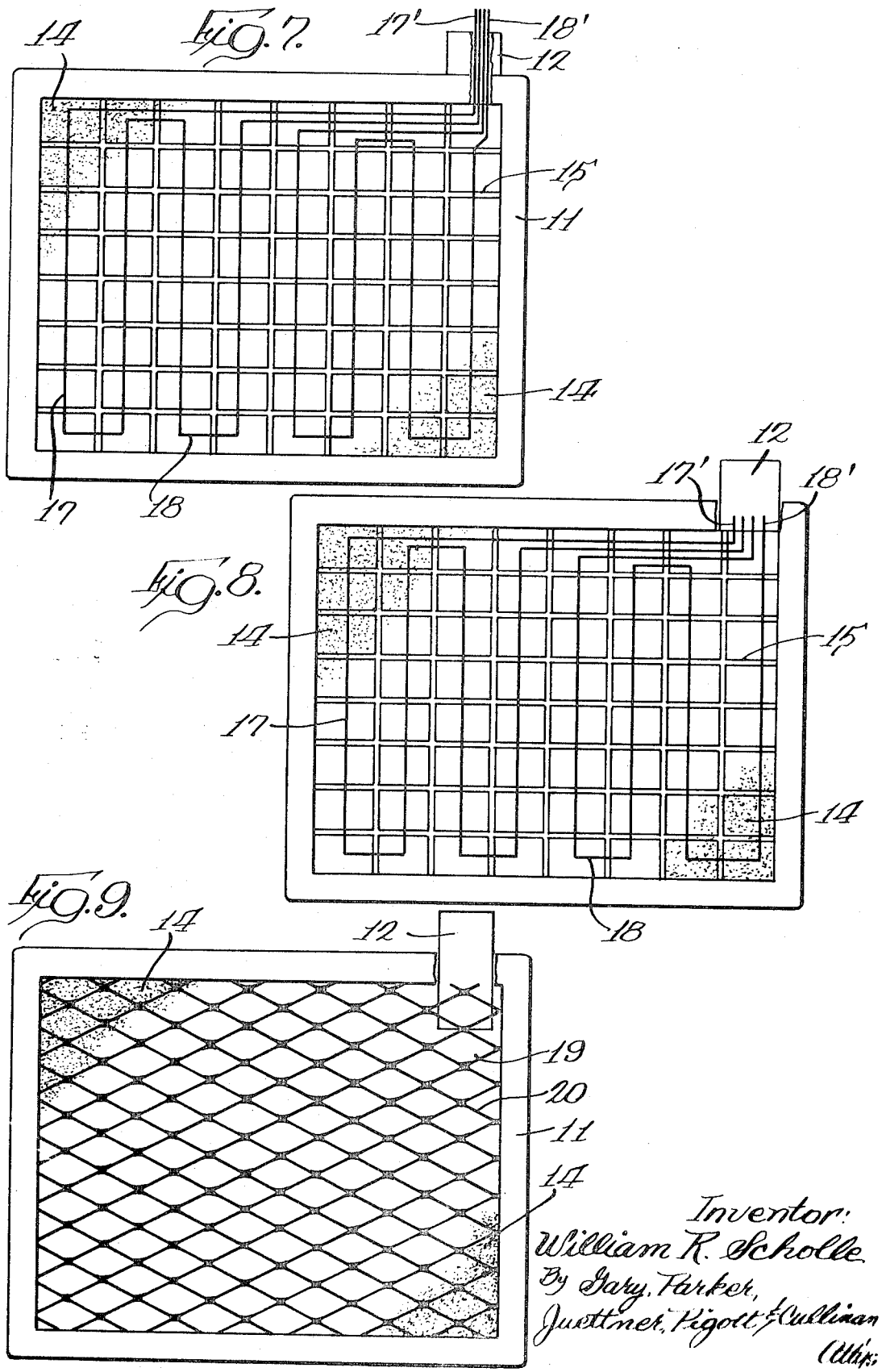

United States Patent Office 3,738,871
Patented June 12, 1973

3,738,871
STORAGE BATTERY PLATES OF PLASTIC
AND LEAD
William R. Scholle, Long Beach, Calif., assignor to
Scholle Corporation, Northlake, Ill.
Filed May 6, 1971, Ser. No. 140,742
Int. Cl. H01m 35/04
U.S. Cl. 136—65                    3 Claims

ABSTRACT OF THE DISCLOSURE

Relates to storage battery plates of the accumulator type reinforced with and containing an appreciable portion of plastic material.

---

This invention relates to battery plates and particularly battery grids for storage batteries of the accumulator type.

The present day standard battery grids are made from lead to which approximately 4% to 6% of antimony has been added as a stiffener since a pure lead grid would be quite soft. The present grids for automotive batteries weigh about from 60 to 70 grams and the grids serve a dual purpose of being an electrical conductor and acting as a mechanical frame to hold lead oxide paste. When the grid is pasted it is then called a battery plate. Lead is used in the grids since it is relatively insoluble in sulfuric acid which serves as the electrolyte. Other metals that are good conductors such as copper would be soluble in sulfuric acid and would poison a lead acid battery.

As is well known, the grid generally comprises, as above indicated, a rectangular frame generally formed with rectangular openings and a laterally projecting lug on its upper edge by means of which a plurality of grids of similar polarity may be fused together or electrically connected in parallel by a bar leading to a battery post. The latter may be of hard rubber, plastic or other material.

Normally, the lead-antimony grid, which has a substantially rectangular frame portion, is further manufactured by pasting the individual grids with a paste of lead oxide containing some sulfuric acid. These pasted grids are then dried and subjected to an electrical charge while in sulfuric acid whereby one group of plates called the negative plates have their lead oxide converted to lead and another group of plates called the positive plates have their lead oxide converted to lead dioxide. A series of plates are then placed in a cell with alternating negative and positive plates so charged that the end plates in each cell are negative together with separators between each battery plate of for example fluted wood, perforated rubber, glass fiber reinforced compositions and the like and the battery then filled with a dilute solution of sulfuric acid.

A cell may comprise 11 plates, the positive plates being connected in parallel and the negative plates being connected in parallel so that the entire cell has the desirable amperage and a voltage of approximately 2.1, and depending on the desired voltage of the battery the requisite number of cells are then connected in series, say for example 6 cells connected in series for a 12-volt battery.

The porous separators which are placed between the alternating negative and positive plates have the primary object of preventing metallic contact between the plates of opposite polarity while freely permitting the electrolytic conduction. As previously indicated, the separators may be of wood veneer, perforated or slotted separators of hard rubber, microporous rubber, fiber glass mats, a variety of plastics such as microporous plastics, fibrous materials impregnated with insoluble resin, woven glass and even porous vitreous materials.

The principal object of the invention is to replace as much of the lead or lead alloy in the grids as possible, say up to 75% or more by weight, and still have sufficient lead remaining as an adequate electrical conductor, while employing plastic for the frame or other parts of the grid. The plastic should be acid resistant and sufficiently rigid to be able to support a lead oxide base as pasted or subsequently converted by charging and discharging.

The new grid of the present invention therefore is a composite of lead and plastic in which there may be one or more pieces of either in composite assembled form, sandwiched form or overlaid or inlaid. A particularly suitable plastic is polystyrene, others being polyethylene, polypropylene, polycarbonates and acrylates. One requisite of the plastic component is that there be enough stiffness to go through the conventional pasting machine in the manufacture of the battery plates.

The result is that there is a saving in the amount of lead, and a saving in weight and overall battery cost. Also, alloying metals such as antimony which causes self-discharge can be eliminated and this makes possible the production of wet batteries which substantially retain their charge until placed in use. The rigidity of the plastic makes possible the use of pure soft lead with resultant long shelf life.

In addition to the above advantage, by employing battery plates wherein at least the frame is composed of plastic, there is the added advantage of preventing bridging between adjacent positive and negative plates.

Summarizing the foregoing, and in accordance with the present invention, plastic replaces more expensive lead or lead alloys resulting in saving in battery costs; it will become possible to save 5 to 10 pounds in weight of the conventional automobile storage battery which would save considerably in freight costs in shipping the battery from the manufacturer to the point of installation, and for example a 20% weight saving in motive power or heavy duty batteries would make the battery-operated automobile more feasible.

Furthermore, such materials as antimony, calcium and other materials which are used in stiffening lead, can be largely or wholly eliminated, these materials not only being expensive but costly to incorporate with the lead and to control. Elimination of the alloy system eliminates battery self-discharge and thus permits acid to be added to the battery long before the battery is to be used. In accordance with the present invention, a very soft or pure lead grid can be supported by stiff plastic. It will be understood that the antimony content of the lead grid can be from 0 to 9% by weight, the calcium content from 0 to 0.1% by weight, and the lithium content from 0 to 0.1% by weight.

Moreover, in one embodiment of the present invention extruded lead wire can be used as a conductive part of the grid, the cost of producing this being less than the present day slow casting or molding methods.

The plastic grid of the present invention further permits the redesign of separators and a separator can be attached or bonded to the plastic grid or a dual function one-piece combination plastic grid-separator can be fabricated. In the fabrication operation, the plastic grids can have an extension which when coupled with the extensions of other grids in the battery group (cell) can act as a mold for the pouring of the battery terminal or post.

Other advantages and economies of the present invention, the details of construction and arrangement of parts will be apparent from a consideration of the following specification and accompanying drawings, wherein FIG. 1 is a plan view of a storage battery plate of the present invention of the composite lead-plastic type.

FIG. 2 is also a plan view of a modified form of a battery plate of the present invention of composite lead-plastic type.

FIG. 3 is a fragmentary enlarged section on the line 3—3 of FIG. 1.

FIG. 4 is a fragmentary enlarged section on the line 4—4 of FIG. 2.

FIG. 5 is a fragmentary enlarged section on the line 5—5 of FIG. 2.

FIG. 6 is a fragmentary enlarged section on the line 6—6 of FIG. 2.

FIGS. 7, 8 and 9 are plan views of modified forms of other composite lead-plastic battery plates formed in accordance with the present invention.

Referring to the drawings, and particularly FIG. 1, there is shown a battery plate comprising a frame having an open window therein with a grid portion of lead or lead alloy 10, but when lead or lead alloys are used they can be in reduced amount. A lead lug 12 extends from the top and is in electrical contact with the grid portion 10. The openings in the grid are filled with lead paste 14 in the conventional manner as previously described. As will be seen from the section of FIG. 3, the grid 10, that is the terminal vertical and horizontal portions thereof, extend into the frame 11 and in reinforcing engagement. The lead grid 10 can be set into recesses in the plastic frame 11 after the frame 11 has been separately fabricated. It will be understood that in the alternative the frame 11 can be molded about and in interlocking engagement with the lead grid 10. In the section of FIG. 3, a pair of similar plates are shown disposed adjacent to each other in a unit or cell separated by the separator 13, one of the plates being positive and the other negative as is also conventional.

It will thus be understood that the lead grid can be embedded in the plastic frame in an injection molding process or plastic that has been fabricated by extrusion, stamping, vacuum forming and other processes and may be joined with the lead shape by laminating, inserting, imbedding or other means. The modified form of FIG. 2 shows a plastic frame 11 with a plastic grid portion 15 which may be molded integrally therewith or separately joined as previously described. A lead lug 12 is also provided for connecting a group of plates and to this lead lug there is connected a lead wire composed of the horizontally extending members 16 and vertically extending members 17 in the form of a lead grid so that in this form of FIG. 2 there is a frame 11 of reinforcing plastic and a composite grid formed of the transverse and vertical plastic components 15 and the lead wire components 16 and 17 connected to the lug 12.

In speaking of lead wires such as 16 and 17 it will be understood that these can be cast or of extruded or die stamped configuration of any desired shape and in the construction of FIG. 2 the wire grid work 16, 17 is inserted into the plastic grid portion 17 for flush mounting.

It will be understood that the apertures in the grid portion of the frame of FIG. 2 are filled with lead paste 14 as conventional and as previously indicated.

Instead of the wires 16 and 17 being connected to a lead lug 12 it will be understood that the wires can be looped outwardly of the frame 11 so as to form a usable facsimile of the lug 12 for connection of an alternate group of plates in parallel as is conventional.

Referring to the modified form of FIG. 7, this also is similar to the form of FIG. 2 in that it comprises a plastic frame 11, plastic grid work 15 extending both horizontally and vertically to leave open spaces for reception of the lead paste 14 and one or more sets of lead wires, namely 17 and/or 18.

The lead wires in this form are shown to terminate at the lug 12 in the ends 17' and 18' whereat they may be welded together or used in combination with or in simulation of the lug 12.

In the modified form of FIG. 8, a construction is shown similar to that of FIG. 7 in that it also comprises the plastic frame 11, plastic grids 15, lug 12 and two sets of lead wire grids 17 and 18 terminating at 17' and 18' in the lug 12. In this case, the terminals 17' and 18' of the lead wires are connected to the cast lug 12 as distinguished from the arrangement of FIG. 7 wherein the terminals 17' and 18' extend outwardly of the lug 12 and act in lieu thereof.

In the modified form of FIG. 9 there is again shown a plastic frame 11, a lead lug 12 and a grid of expanded conductive metal of open diamond or other design or pattern. Of course, the lead paste 14 is disposed between and supported by the metal grid bars 19 and 20, this form being illustrative of one desired configuration other than the rectangular conventional arrangement and is indicative of other possible modifications.

Although I have shown and described the preferred embodiments of my invention, it will be understood by those skilled in the art that changes may be made in the details thereof without departing from its scope as comprehended by the following claims.

I claim:

1. A storage battery plate consisting essentially of a rectangular polymer plastic frame having an open window therein, a grid in said open window, said grid being composed entirely of lead in the form of a plurality of intersecting horizontal and vertical thin lead wires, and a terminal connected to said grid, said grid being substantially entirely filled with battery paste to present a continuous coating of battery paste on both sides thereof.

2. A storage battery plate consisting essentially of a rigid polymer plastic frame having an open window therein, a grid in said window comprising a plurality of intersecting horizontal and vertical non-conductive members connected to said frame, a plurality of intersecting horizontal and vertical lead wires disposed in said window and supported by said grid, a terminal connected to said lead wires, and battery paste covering said grid and lead wires.

3. A storage battery plate consisting essentially of a rigid polymer plastic frame having an open window therein, a grid in said open window, said grid being composed entirely of a conductive material in the form of an expanded metal matrix, a conductive terminal extending from the frame and connected to said grid, and battery paste covering said grid.

References Cited
UNITED STATES PATENTS

| | | | |
|---|---|---|---|
| 3,247,023 | 4/1966 | Geissbauer | 136—59 |
| 3,083,250 | 3/1963 | Geissbauer | 136—38 |
| 3,556,854 | 1/1971 | Wheadon et al. | 136—37 |
| 2,694,100 | 11/1954 | Zahn | 136—58 |
| 3,269,863 | 8/1966 | Helms | 136—65 |
| 3,516,864 | 6/1970 | Willmann | 136—36 |
| 3,556,855 | 1/1971 | Howells | 136—65 |
| 3,607,412 | 9/1971 | Holloway | 136—36 |
| 3,287,165 | 11/1966 | Jensen | 136—65 |
| 3,310,438 | 3/1967 | Huffman et al. | 136—36 |

WINSTON A. DOUGLAS, Primary Examiner

C. F. LE FEVOUR, Assistant Examiner

U.S. Cl. X.R.

136—37, 58